United States Patent [19]
Lambert et al.

[11] 3,935,419
[45] Jan. 27, 1976

[54] SEVERING OF GLASS OR VITROCRYSTALLINE BODIES

[75] Inventors: Emmanuel Lambert, Brussels; Jean-Louis Lambert, Chaumont-Gistoux; Bernard De Longueville, Sterrebeek, all of Belgium

[73] Assignee: Glaverbel-Mecaniver S.A., Watermael-Boitsfort, Belgium

[22] Filed: Oct. 11, 1973

[21] Appl. No.: 405,597

[30] Foreign Application Priority Data
Oct. 12, 1972 Luxemburg............................ 66279

[52] U.S. Cl. ............ 219/121 LM; 65/113; 225/93.5
[51] Int. Cl.² .......................................... C03B 33/00
[58] Field of Search.... 219/121 L, 121 LM; 65/176, 65/112, 113; 225/93.5; 331/DIG. 1

[56] References Cited
UNITED STATES PATENTS

| | | | |
|---|---|---|---|
| 3,453,097 | 7/1969 | Hafner........................ | 219/121 LM |
| 3,543,979 | 12/1970 | Grove et al..................... | 219/121 L |
| 3,588,440 | 6/1969 | Morse.......................... | 219/121 LM |
| 3,589,883 | 6/1971 | Dear............................. | 219/121 LM |
| 3,800,991 | 4/1974 | Grove et al....................... | 225/93.5 |

*Primary Examiner*—J. V. Truhe
*Assistant Examiner*—Clifford C. Shaw
*Attorney, Agent, or Firm*—Spencer & Kaye

[57] ABSTRACT

In the severing of bodies of glass or vitrocrystalline materials by the application of a laser beam, the severing operation is improved by employing a beam of which at least the predominent wavelength is such that at least 10% of the beam energy penetrates the body to a depth of at least 0.2 mm.

9 Claims, 3 Drawing Figures

SEVERING OF GLASS OR VITROCRYSTALLINE BODIES

BACKGROUND OF THE INVENTION

The present invention relates to a method of severing a body of vitreous or vitrocrystalline material by irradiating the body with at least one laser beam. The invention also relates to an apparatus for the performance of the method.

It is known to sever glass by means of a laser beam. The use of a laser beam has been the subject of research by prominent glass manufacturers. The teaching resulting from this research is that the laser beam should have a wavelength such that the energy absorption by the glass is as high as possible. Such teaching is provided, for example, by United Kingdom Patent Specification No. 1,246,481. More specifically, the prior teaching proposes the use of a $CO_2-N_2-He$ laser producing a radiation wavelength of 10.6 microns.

In the case of thick vitreous sheet material, it has been found that when attempting to use a $CO_2-N_2-He$ laser, the material is often not severed or is not cleanly severed along the intended line, the severed edges exhibiting irregularities or jagged portions. The failure to reliably and consistently achieve a clean severance is particularly notable in the case of vitreous sheet material having a thickness in excess of 5 mm.

One of the factors which influences the results when irradiating the vitreous sheet material by means of a laser beam is the amount of radiation which is incident upon each point of the material along the intended line of severance. In order to cut relatively thick sheets, one would accordingly expect that the poor results above referred to were attributable to an insufficient energy absorption concentration at each irradiated point. Attempts have therefore been made to improve the results by increasing the energy of the laser beam.

It has been found that the required results cannot be achieved in this way. A clean severance of the vitreous sheet material does not take place. With an increase in the energy of the radiation incident upon a sheet of given thickness above 5 mm there is increasing tendency for the severance, when it occurs, to create chipped or jagged fragile edges. Moreover, in the case of very thick sheets the energy of the incident radiation has to be increased to such an extent that the first noticeable effect of the irradiation is a softening of the surface layer of glass, which of course precludes all possibility of the clean severance which it is desired to achieve.

Quite apart from the fact that the use of higher radiation dosages does not give the desired results, it is undesirable because it involves either more power consumption or a slower relative speed between the laser beam and the sheet material. In the flat glass production industry the need is for rapid cutting of the glass. This is notably so in the cutting of a ribbon of drawn sheet glass as it leaves the drawing machine. In the drawing of sheet glass by the Pittsburgh process, for example, the drawing speed may be of the order of 30 m per hour for glass 6 mm in thickness and the speed at which the ribbon continuously cut to remove its thick margins has to keep pace with this drawing speed.

SUMMARY OF THE INVENTION

It is an object of the present invention to sever, using a laser beam, sheet material having a wider range of thicknesses than could be severed by the methods hitherto proposed.

According to the present invention, there is provided a method of severing a body of vitreous or vitrocrystalline material by irradiating the body with at least one laser beam, wherein the laser beam has at least a predominant wavelength such that at least 10 percent of the energy of such laser beam penetrates the body to a depth of at least 0.2 mm.

The term "vitrocrystalline material" as used herein denotes a material obtained by thermally treating glass to induce the formation of one or more crystalline phases therein.

The method according to the invention involves a radical departure from the previous teaching in this art. Underlying the invention is the discovery that in order to achieve the required results, the maximum energy absorption at the surface of the vitreous material which is advocated by the previous teaching in this branch of technology should be avoided. The method according to the invention makes use of a laser beam to which the glass is appreciably less absorbent. By using radiation to which the vitreous material is more transparent, a severing method is realized which is of a much greater potential application.

In particular the method according to the invention enables vitreous or vitrocrystalline sheet material having a thickness far in excess of that for which the prior method is suitable, to be cleanly severed by means of a laser. The method according to the invention is moreover applicable for high speed cutting, as is required for example when cutting ribbons of drawn sheet glass. These advantages can be achieved with an electrical power consumption which is not, or is not significantly, higher than that involved in the prior method.

In carrying out the invention, the wavelength of the or each laser beam, its energy and the speed at which the laser beam traces along the required line of severance are, for best results, selected with due regard to the thermomechanical properties of the vitreous or vitrocrystalline material and the thickness of this material. These however are factors which can easily be selected, on the basis of simple tests, to give the required results.

In general, the composition of the vitreous or vitrocrystalline material is not critical. The method can be employed for severing any glass with a positive coefficient of thermal expansion. The invention is primarily but not exclusively intended for use in the severance of ordinary soda-lime glass. Generally speaking, operative conditions, including the laser beam wavelength, which are suitable for severing such a glass are likewise suitable for severing other types of glass.

Advantageously, the laser beam, or at least one of the laser beams, with which the body is irradiated has a wavelength or a predominant wavelength such that at least 50 percent of the energy of such laser beam penetrates to a depth of at least 0.2 mm.

In preferred embodiments of the invention, the method is applied for severing a body of vitreous or vitrocrystalline material having a thickness equal to or greater than 5 mm. The advantages of the method are particularly notable in work of this kind because it is work for which the prior method is entirely unsuitable, even in situations in which severed edges of only moderate quality would be acceptable. In particularly valuable embodiments of the invention, the body of material being severed has a thickness in the range 5 to 25 mm. That thickness range corresponds to the thickness range in which vitreous and vitrocrystalline sheet material is industrially manufactured. It is remarkable that bodies of this thickness can be efficiently severed. The term "thickness," as used herein in reference to a body of vitreous or vitrocrystalline material, denotes the dimension of the body measured normal to an irradiated face thereof.

Preferably, the laser beam, or at least one of the laser beams, with which the body is irradiated produces radiation having a wavelength in the range from 0.5 to 6 microns. Lasers of such wavelength are particularly effective for inducing breaking stresses in bodies of a thickness equal to or greater than 5 mm.

In one embodiment of the invention, the laser beam, or at least one of the laser beams, with which the body is irradiated is a DYE laser, YAG laser, CO laser, Ga-As laser, or HF laser.

As is known in the art, a YAG laser is a Nd-doped Yttrium-Aluminium-Garnet laser. Such a laser produces a wavelength centered on 1.06 microns. Radiation of that wavelength penetrates significantly into the vitreous or vitrocrystalline material. For example, for a sheet of glass 20 mm thick, more than 50 percent of the incident radiation is absorbed in the interior layers of the material. It is obviously an advantage that the invention can be carried out using commercially available laser generators.

Some other specific lasers which can be used in lieu of or in addition to YAG lasers, are: the DYE lasers, which are a family of organic lasers having a wavelength which is also centered at or approximately at 1.06 microns; the carbon monoxide laser having a wavelength centered on 5 microns; semiconductor lasers, e.g. a Gallium-Arsenide laser having a wavelength centered on 0.85 microns; and a HF (Hydrofluoric acid) laser having a wavelength centered on approximately 2.9 microns.

In carrying out the invention, the vitreous or vitrocrystalline body may be irradiated with two or more laser beams acting at different sections along an intended line of severance. The different laser beams may be of identical wavelength. By using two or more laser beams in that way the severance can be effected more rapidly.

In certain embodiments of the invention, the body is irradiated with two or more such laser beams of different wavelengths such that the body has different degrees of transparency to the different beams. This feature promotes a more favorable energy stress distribution through the thickness of the body and enables true, chip-free separated edges to be even more easily obtained.

Advantageously, the body is irradiated with a laser beam having a wavelength above 6 microns. The results obtainable by such a method are extremely good over a wide range of sheet material thicknesses ranging from 5 mm to 25 mm, and even above that range.

In certain embodiments of the invention, the vitreous or vitrocrystalline body is severed solely by the action of the one or more laser beams having a wavelength, or a predominant wavelength, such that at least 10 percent of the energy of such beam penetrates to a depth of at least 0.2 mm. Such embodiments have the merit of simplicity in that there is no need to provide mechanical means for weakening or stressing the body to assist the severance thereof.

It is to be understood, however, that the invention does not exclude methods in which some force other than the thermal stresses induced by the irradiation with the said laser beam or beams is imposed on the body to assist division of it along the required line of severance. For example, the action of such laser beam or beams may be supplemented by some mechanical force applied while the material is irradiated to assist the division.

The body of material may be irradiated with at least one laser beam, e.g. a $CO_2$ laser beam, having a wavelength to which the material has a coefficient of absorption above 400 $cm^{-1}$ simultaneously with the irradiation of the body with one or more laser beams which are more penetrating in that they produce penetration of at least 10 percent of the energy to a depth of at least 0.20 mm.

When using a laser beam of penetrating radiation in accordance with the invention, the advantageous results hereinbefore described are apparently attributable to the absorption of radiant energy in layers of the material which are at a greater depth than the depth to which a $CO_2$ laser can penetrate. A $CO_2$ laser beam has a wavelength of 10.6 microns and the transmissivity of ordinary glass with respect to such radiation is practically zero. Actually, about 90 percent of the radiation energy is absorbed in the first tenth of a millimeter of thickness of the glass so that there is a high risk of the laser spoiling the surface of the glass without inducing the required breaking stresses unless the radiation dosage at each irradiated point is sufficiently restricted.

However, by supplementing the action of the more deeply penetrating laser or lasers by a $CO_2$ laser or by some other laser to which the glass is more absorbent, a more favorable energy stress distribution depthwise of the material can be realized. This is of advantage in particular for severing thick bodies, for example bodies having a thickness in excess of 10 mm. Such a combination of lasers of different wavelengths is also advantageous however for severing vitreous and vitrocrystalline bodies of lesser thickness.

Advantageously, at least two laser beams of different wavelengths are so directed so that they simultaneously irradiate the body along the line of severance. This procedure causes the method to be less sensitive to variations in the thickness of a body along the line of severance, i.e. variations in thickness of the body can more easily be accommodated without loss of quality of the separated edges.

In preferred embodiments of the invention, a continuous relative movement is produced between the laser beam or beams and the body of material to cause the body to be progressively irradiated with such beam or beams along the line of severance. In this way it is possible to bring about severance along a line of any length by means of a beam or beams which irradiate one point on the material at a time. A nicely controlled progressive separation of the body along the required line of severance can be brought about. The body to be severed is preferably irradiated at every point along the intended line of severance. However this is not in all cases essential.

For example, a pulsed laser beam may be used while continuously relatively displacing the laser beam source and the body of material to be severed. It appears that in some cases higher laser beam energies can be used for severing a body of a given thickness if the laser beam is pulsed. The intensity of the or each laser beam is preferably selected so that it is at, or about, the lowest value which will be effective at the selected speed of the relative movement. In that case, unnecessarily high energy concentrations at or near the surface of the sheet material are avoided, which is a factor of importance for the quality of the separated edges.

Preferably the laser beam, or at least one of the laser beams, diverges in the direction in which it enters the body to be severed. This feature makes it possible to compensate to some extent for the exponential decrease in the energy absorption with increasing depth of penetration of the body.

The invention includes methods in which the body of material is scored along the required line of severance and the or at least one such laser beam is directed onto the body at the score line.

By scoring the body, the line of severance can be even more reliably predetermined. The course of the score line can be easily and accurately controlled. Another advantage of such methods is that the severing operation is insensitive or less sensitive to mechanical stresses preexisting in the body. More particularly, if the intended line of severance, along which the body is scored, crosses a fault in the body, the fault at most presents a local imperfection in the separated edges of the body and does not cause fracturing stresses to be randomly propagated away from the intended line of severance. The fracture follows the score line, if not through the fault, then at least up to the boundary or boundaries of the fault intersected by such line. For example, it is possible by the method according to the invention to bring about fracture of a ribbon of sheet glass, formed by a conventional drawing process, along a transverse line extending through the edge-roll beadings at the ribbon edges.

Another advantage of methods involving scoring of the body is that severance of a given vitreous or vitrocrystalline body can be achieved with a laser beam of lesser energy than would otherwise be required.

In preferred methods involving a scoring step as above referred to, the body of material is traversed along the line of severance by a tool which scores the material, and by the laser beam or beams which follow the tool in a tandem manner. Such embodiments of the method are advantageous from the point of view of time saving. Moreover, it is much easier when proceeding in that way to ensure that the line traced out on the body by the laser beam or beams strictly coincides with the line traced by the scoring tool.

The invention includes methods in which the vitreous or vitrocrystalline body is in continuous movement during the laser beam irradiation thereof. Generally speaking, it is more convenient and satisfactory to displace the body continuously during the irradiation. The body may for example be severed while travelling along part of a production or treatment line. Sheet glass can for example be severed while being continuously conveyed from an annealing lehr.

The invention is of particular importance as applied to the severance of a continuous glass ribbon. Thus the invention can be applied for severing a continuous glass ribbon at the outlet of an annealing lehr into predetermined lengths and/or for severing such ribbon along its edges.

The invention includes apparatus for use in severing a body of vitreous or vitrocrystalline material by a method according to the invention as above defined, the apparatus being characterized in that it includes means for creating a relative displacement between a body of vitreous or vitrocrystalline material and at least one laser beam produced by a DYE laser, a YAG laser, a CO laser, a Ga-As laser or a HF laser, for severing the body along a predetermined line of severance. This apparatus has the advantage that vitreous and vitrocrystalline bodies of a wide range of thickness, e.g. sheet material having a thickness in excess of 5 mm, can be easily severed.

The invention also includes apparatus for use in severing a ribbon of glass as it leaves a forming machine, e.g. a glass drawing machine, the apparatus including a laser beam generator for emitting a laser beam having a wavelength, or a predominant wavelength, such that at least 10 percent of the energy of such beam penetrates the ribbon to a depth of at least 0.2 mm.

DESCRIPTION OF THE PREFERRED EMBODIMENTS

Figure 1:
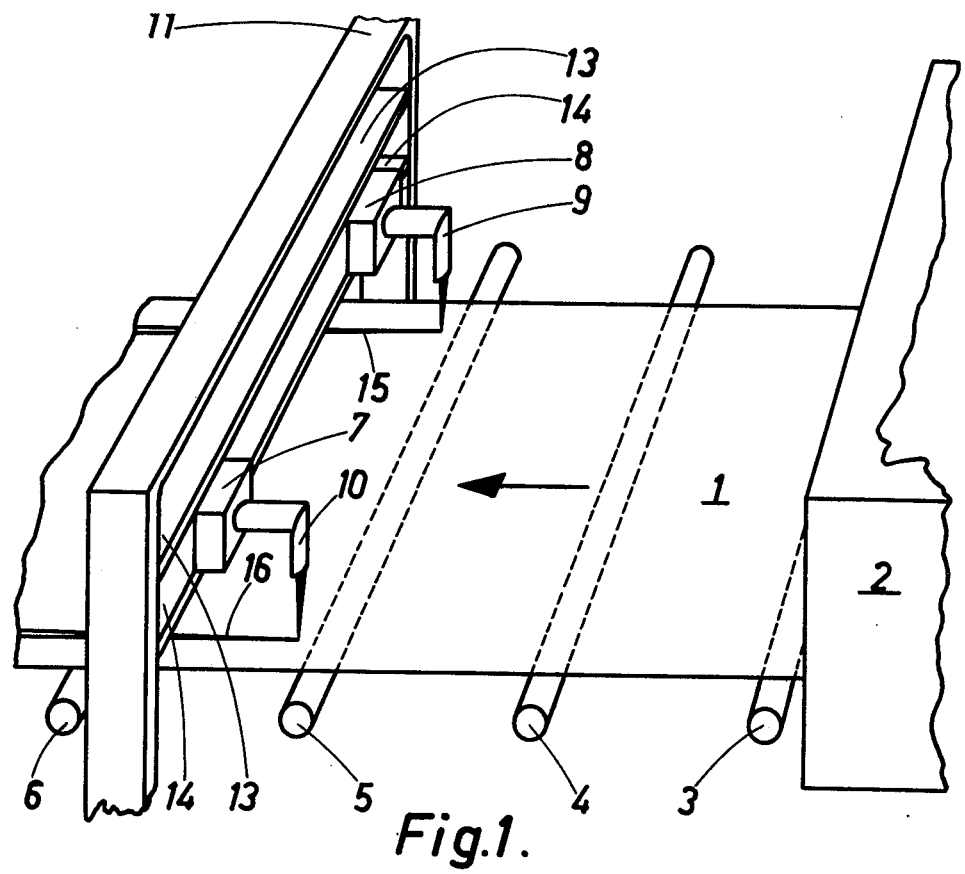
FIG. 1 is a perspective view of one embodiment of apparatus according to the invention.

In the embodiment illustrated in FIG. 1, a ribbon of glass 1 having a thickness of 8 mm and leaving a horizontal annealing lehr 2 is conveyed by conveying rollers 3, 4, 5 and 6 beneath a gantry 11 bridging the ribbon path. The gantry supports two YAG laser generators 7 and 8. The positions of the generators can be adjusted along guides 13 and 14 by adjustment means (not shown). The laser generators have respective focusing devices 9 and 10 for focusing the laser beam onto the glass ribbon. The laser generators have conventional energy supply and cooling systems (not shown).

By the illustrated apparatus the method according to the invention can be carried out for continuously severing the glass ribbon longitudinally, as indicated at 15 and 16, for removing the edge portions of the ribbon where its thickness profile is not of the required standard. The ribbon edges tend in particular to be of inferior quality in the case of sheet glass drawn by the Libbey-Owens process, but edge cutting is also practiced in the case of sheet glass drawn by other processes, e.g. by the Pittsburgh vertical drawing process. The laser beams are brought to a focus at a certain depth below the top face of the glass ribbon and as the ribbon advances the ribbon is cut by the lasers strictly along the lines traced by the laser beams thereon.

The gantry 11 can be mounted so that it can be moved relative to the annealing lehr to compensate for sudden temporary variations in the ribbon drawing speed, or to allow a laser beam to act for a few moments on a given spot on the ribbon where it proves to be more resistant to breakage.

According to a modification of the embodiment illustrated in FIG. 1, an optical device is provided in the path of the laser beam in order to give the beam a divergent path so as to compensate for the decrease in the energy absorption. This feature makes it possible to reduce the power of the laser.

It will be easily apparent how apparatus may be devised for applying the method according to the invention for cutting a continuous ribbon of glass simultaneously at different places.

Figure 2:
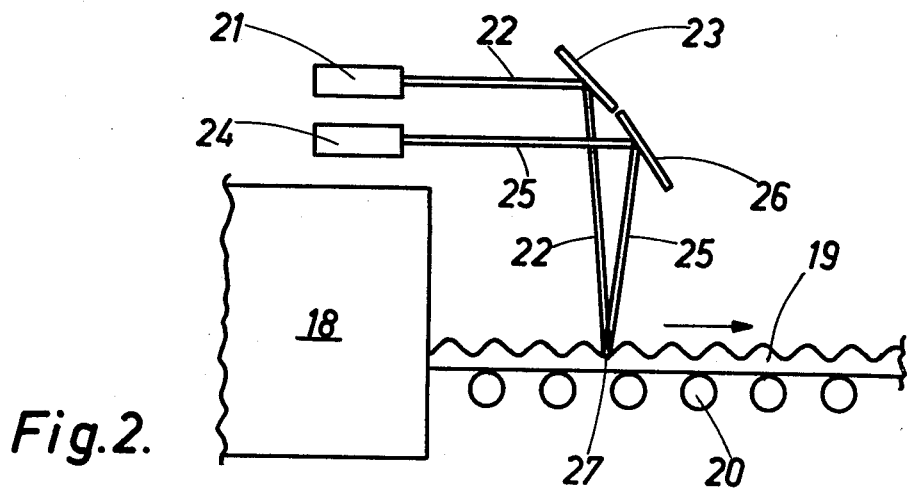
FIG. 2 is a side elevational view of another embodiment of apparatus according to the invention.

FIG. 2 shows an apparatus which is particularly suitable for cutting figured, or patterned, glass. Ribbons of figured glass exhibit thickness variations which are in some cases substantial. The variations result from the surface configuration of the patterned roll which acts on the upper surface of the ribbon of glass. On leaving the annealing lehr 18, the ribbon 19 of figured glass has an overall thickness of between 6 and 7 mm and an average surface indentation depth of about 2 mm. The ribbon is advanced over a conveyor composed of ribbon supporting rollers 20.

The apparatus includes a laser source 21 emitting a laser beam of a wavelength such that the laser beam is partly absorbed within the thickness of the glass ribbon. The source 21 may for example be a YAG laser source, the laser beam having a wavelength of 1.06 microns. The laser source is situated at a convenient position, in this case above the exit end of the annealing lehr 18. The laser beam is emitted parallel to the glass ribbon and is reflected by a mirror 23 onto the glass ribbon at a location such that the beam traces along the required cutting line during the advance of the ribbon in the direction indicated by the arrow. The apparatus also includes a second laser source 24. This source emits a laser beam 25 having a wavelength exceeding 4 microns. This laser may for example be a $CO_2$ laser having a wavelength centered on 10.6 microns. The laser beam 25 is very strongly absorbed by the glass. The beam 25 is likewise emitted parallel with the glass ribbon and is reflected by a mirror 26 onto the glass ribbon. The mirrors 23 and 26 are arranged so that the spots on the glass ribbon on which the beam 22 and 25 impinge are conincident or are very close to each other.

By virtue of the use of two laser beams, one of which is very strongly absorbed by the glass and the other of which penetrates into the interior layers of the glass, the glass ribbon can be very cleanly cut notwithstanding the marked variations in its thickness from one point to another. If the $CO_2$ laser were to be used alone it would not cut the glass at the location where the glass has its maximum thickness of 6–7 mm, i.e.., at the locations of the crests in the profile of the top face of the ribbon. When using the illustrated apparatus, the glass is cleanly cut at those locations by the action of the YAG laser, whereas the $CO_2$ laser is wholly or mainly responsible for creating the severing stresses in the glass at those locations where the glass is of substantially lesser thickness, i.e., at the locations of the hollows in the profile of the top face of the ribbon. At those locations the glass has a thickness in the region of 3–4 mm.

The apparatus shown in FIG. 2 therefore makes it possible to obtain a continuous and clean severance along a predetermined line, notwithstanding the variations in the thickness of the glass ribbon.

The apparatus according to FIG. 2 can also be used for cutting ribbed glass along lines which run across the lines of the ribs. Such glass cannot be cut by the previously known method using a $CO_2$ laser. When using the apparatus shown in FIG. 2 employing a $CO_2$ laser and a YAG laser as above described, the ribbed glass can be easily and cleanly cut in any required direction.

In another embodiment of the invention a ribbon of soda-lime glass having a thickness of 14–15 mm was cut along a predetermined line by irradiating glass along that line with a Ga-As semiconductor laser having a radiation wavelength of 0.85 microns. At least 10 percent of the energy of the laser penetrated to a depth of at least 0.2 mm from the face of the glass onto which the laser was directed. The absorbed radiations induced thermo-mechanical stresses in interior layers of the glass.

The glass was simultaneously irradiated by a $CO_2$ laser which was directed so as to impinge on the glass at a spot immediately behind the spot irradiated by the Ga-As laser. In other words, the Ga-As and $CO_2$ lasers traced in tandem along the required line of severance.

The glass was accurately severed along the required line and the separated pieces of glass exhibited clean severed edges. It was found that by using the $CO_2$ laser in addition to the Ga-As laser the energy of the Ga-As laser could be made considerably less than is necessary for obtaining comparable results when using a Ga-As laser alone.

In a further embodiment of the invention, a ribbon of glass having a thickness of 14–15 mm was severed by irradiating it with a Ga-As laser and a $CO_2$ laser as above described, but the irradiation of each spot along the intended line of severance was preceded by mechanical scoring of the glass along that line. In that case the same good results could be achieved with laser beams of lesser energy.

Figure 3:
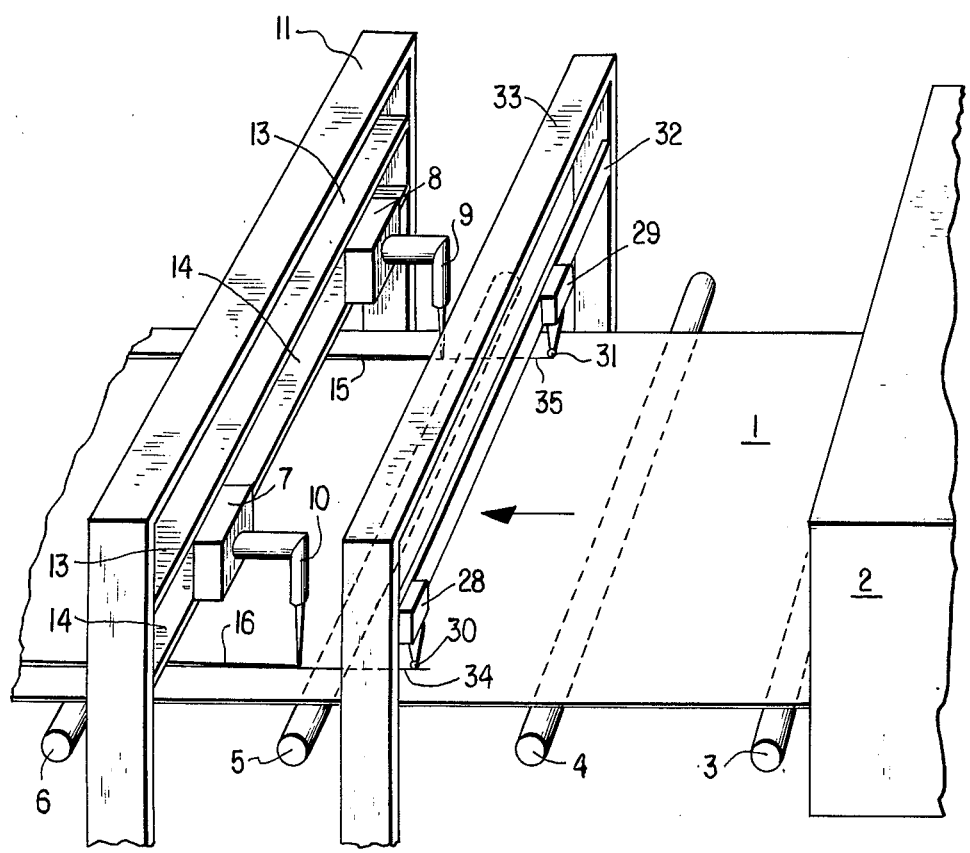
FIG. 3 is a view similar to that of FIG. 1 of another embodiment of the apparatus according to the invention.

Such an embodiment is illustrated in FIG. 3 which shows apparatus including all of the structure of FIG. 1 together with a mechanical scoring unit composed of a gantry 33 similar to gantry 11 and bridging ribbon 1 in front of gantry 11, relative to the direction of advance of glass ribbon 1. Gantry 33 carries a guide 32 supporting scoring tools 28 and 29. Each scoring tool carries a respective scoring wheel 30, 31. Tools 28 and 29 are positioned to be in line with laser beam generators 7 and 8 so as to score the glass ribbon along severance lines 34 and 35 before the ribbon is irradiated by the beams from generators 7 and 8 along the same lines.

It will be understood that the above description of the present invention is susceptible to various modifications, changes and adaptations, and the same are intended to be comprehended within the meaning and range of equivalents of the appended claims.

We claim:

1. In a method for severing a body of soda-lime glass having a thickness of at least 5 mm by irradiating the body with at least one laser beam producing energy which is absorbed by the body to induce breaking stresses therein, the improvement comprising irradiating the body with at least two laser beams of respectively different wavelengths with respect to which the body has respectively different degrees of transparency and giving at least one of the laser beams at least a predominant wavelength such that at least 10 percent of the energy of such laser beam penetrates the body to a depth of at least 0.2 mm.

2. A method according to claim 1 wherein the at least one laser beam with which the body is irradiated has at least a predominant wavelength such that at least 50 percent of the energy of such laser beam penetrates to a depth of at least 0.2 mm.

3. A method according to claim 1 wherein at least one laser beam with which the body is irradiated has a wavelength in the range from 0.5 to 6 microns.

4. A method according to claim 1 wherein at least one laser beam with which the body is irradiated is produced by a DYE laser, YAG laser, CO laser, Ga-As laser, or HF laser.

5. A method according to claim 1 wherein one of the laser beams has a wavelength in one of the ranges from 0.85 to 1.2 microns and from 2.5 to 4 microns and a second of the laser beams has a wavelength above 6 microns.

6. A method according to claim 1 wherein the body is severed along a given line solely by such irradiation.

7. A method according to claim 1 wherein the at least two laser beams of respectively different wavelength are directed so that they simultaneously irradiate the body along the line of severance.

8. A method according to claim 1 further comprising producing a continuous relative movement between the laser beams and the body of material to cause the body to be progressively irradiated with such beam along the line of severance.

9. A method according to claim 1 comprising causing at least one of the laser beams to have the form of a divergent beam where it enters the body.

* * * * *